UNITED STATES PATENT OFFICE.

GENNARO ROSSI, OF NEW YORK, ASSIGNOR OF ONE-HALF OF HIS RIGHT TO LUIGI MARESCA, OF BROOKLYN, N. Y.

PAINT COMPOSITION.

SPECIFICATION forming part of Letters Patent No. 229,473, dated June 29, 1880.

Application filed November 13, 1879.

*To all whom it may concern:*

Be it known that I, GENNARO ROSSI, of the city, county, and State of New York, have invented a new and Improved Composition for Paints, of which the following is a specification.

The invention consists in a paint composition for wood-work, walls, and the bottoms of vessels, to produce a water-proof surface, and on vessels to prevent the adherence of barnacles and grass.

The composition is prepared as follows: of refined petroleum, four gallons; boiled linseed-oil, one-half gallon; beeswax, one and one-half pound; sugar of lead, one pound; garlic-juice, one-half pound; milk of sulphur, two pounds; cayenne pepper, one pound; tallow, one pound. These ingredients will make five gallons of the composition. All except the milk of sulphur are mixed together and boiled for about an hour, then strained, and when tepid the milk of sulphur is added. A pasty mass is formed that may be used with any ordinary paint of any preferred color, and which may be readily applied with a brush.

Having thus described all that is necessary to a full understanding of my invention, what I claim as new is—

The described paint composition, consisting of refined petroleum, boiled linseed-oil, beeswax, sugar of lead, garlic-juice, milk of sulphur, cayenne pepper, and tallow, in about the proportions specified.

GENNARO ROSSI.

Witnesses:
  GEO. D. WALKER,
  CHAS. SEDGWICK.